United States Patent
Longo et al.

(10) Patent No.: US 10,662,380 B2
(45) Date of Patent: May 26, 2020

(54) VINYL POLYMERS HAVING A FLAME-RETARDANT FUNCTION

(71) Applicant: versalis S.p.A., San Donato Milanese (MI) (IT)

(72) Inventors: Aldo Longo, Mantova (IT); Attilio Arienti, Mantova (IT); Giuditta Vannucci, Mantova (IT)

(73) Assignee: versalis S.p.A., San Donato Milanese (MI) (IT)

( * ) Notice: Subject to any disclaimer, the term of this patent is extended or adjusted under 35 U.S.C. 154(b) by 0 days.

(21) Appl. No.: 15/119,564

(22) PCT Filed: Mar. 26, 2015

(86) PCT No.: PCT/IT2015/000083
§ 371 (c)(1),
(2) Date: Aug. 17, 2016

(87) PCT Pub. No.: WO2015/145478
PCT Pub. Date: Oct. 1, 2015

(65) Prior Publication Data
US 2017/0051209 A1    Feb. 23, 2017

(30) Foreign Application Priority Data

Mar. 28, 2014 (IT) .............................. MI2014A0544

(51) Int. Cl.
| | |
|---|---|
| *C08L 25/08* | (2006.01) |
| *C09K 21/14* | (2006.01) |
| *C08F 293/00* | (2006.01) |
| *C08F 220/22* | (2006.01) |
| *C08F 220/32* | (2006.01) |

(52) U.S. Cl.
CPC ............ *C09K 21/14* (2013.01); *C08F 220/22* (2013.01); *C08F 220/32* (2013.01); *C08F 293/005* (2013.01); *C08L 25/08* (2013.01); *C08F 220/325* (2020.02); *C08F 2438/02* (2013.01); *C08L 2201/02* (2013.01)

(58) Field of Classification Search
CPC .... C08F 220/22; C08F 212/08; C08F 218/08; C08F 293/005; C08F 220/32; C08F 2438/02; C08F 2220/325; C09K 21/14; C08L 25/08; C08L 2201/02
See application file for complete search history.

(56) References Cited

U.S. PATENT DOCUMENTS

| | | | |
|---|---|---|---|
| 3,624,012 A | 11/1971 | Case | |
| 3,880,957 A * | 4/1975 | Tucker et al. | ........ C08F 283/06 525/404 |
| 8,242,183 B2 | 8/2012 | King et al. | |
| 8,569,424 B2 | 10/2013 | Vogel et al. | |
| 2010/0317757 A1 | 12/2010 | King et al. | |
| 2010/0331497 A1 | 12/2010 | Vogel et al. | |

FOREIGN PATENT DOCUMENTS

| | | |
|---|---|---|
| EP | 2 524 945 B1 | 11/2012 |
| JP | 50-157494 | 12/1975 |
| JP | 50157494 | * 12/1975 |

OTHER PUBLICATIONS

International Search Report and Written Opinion of the International Searching Authority dated Oct. 6, 2015 in PCT/IT2015/000083 filed Mar. 26, 2015.
Japanese Office Action in corresponding Patent Application No. 2016-553559, dated Oct. 18, 2018. (w/English Translation).
Acceptance Decision issued in Russian application No. 2016136648/04 dated Dec. 11, 2018. (w/English Translation).
Indian Office Action dated Dec. 16, 2019 in Indian Patent Application No. 201647032758 (with English translation), citing documents AA and AO therein, 5 pages.

* cited by examiner

*Primary Examiner* — Nathan M Nutter
(74) *Attorney, Agent, or Firm* — Oblon, McClelland, Maier & Neustadt, L.L.P.

(57) ABSTRACT

The present invention relates to vinyl polymers having certain characteristics which confer flame-retardant properties to the polymer and their polymeric compositions with other vinyl polymers.

11 Claims, No Drawings

VINYL POLYMERS HAVING A FLAME-RETARDANT FUNCTION

The present invention relates to vinyl polymers containing halohydrin and epoxy groups, the use of said polymers as flame retardants, polymeric compositions containing said polymers and polymeric granules containing said compositions.

In the present patent application, all the operating conditions indicated in the text should be considered as being preferred conditions even if not expressly stated.

For the purposes of the present document, the term "comprise" or "include" also comprises the term "consist in" or "essentially consisting of".

For the purposes of the present document, the definitions of the ranges always comprise the extremes unless otherwise specified.

Halogenated organic additives are used in the preparation of polymeric compositions having flame-retardant properties, wherein the halogen is bromine and/or chlorine. Said additives can be mixed in the molten state with the polymeric mass to confer an improved flame-resistance.

A halogenated organic additive is a compound which releases halogen radicals at flame temperatures, said radicals, by reacting with the oxygen of the atmosphere, protect the polymeric compound from combustion. A good halogenated flame-retardant additive must be miscible with the polymeric mass, stable at the mixing temperatures and unstable at flame temperatures.

Halogenated organic compounds suitable as flame retardants, such as hexabromocyclododecane and brominated styrene-butadiene copolymers, are effective for overcoming standardized flame-resistance tests; they can, however, release significant quantities of halogen acid at temperatures of 200° C. and higher, i.e. temperatures at which mixtures with the polymer to which a great flame stability is to be conferred, are prepared.

U.S. Pat. No. 8,242,183 describes some polymers having a flame-retardant function, among which 3-bromo-2-hydroxypropyl ethers of phenolic resins. The compositions containing polystyrene and said hydrobrominated resins are prepared in the molten state, at an unspecified temperature, and the samples for the flame-resistance tests are prepared with a press, setting the moulding temperature at 180° C.

U.S. Pat. No. 8,569,424 describes a brominated polymer containing epoxy groups which have a weight loss of 5% at temperatures of at least 180° C. The formation of bromohydrins is excluded in the synthesis methods described.

In the known art, there is the need for having flame-resistant polymeric compositions whose components are stable at the preparation temperature of the compositions themselves and in which effective flame-retardant substances are present, in terms of quality and quantities which do not jeopardize the properties of the polymeric matrix in which they are contained.

The objective of the present invention is therefore to improve the thermal stability of halogenated flame retardants in self-extinguishing polymeric compositions based on vinyl polymers, inducing a smaller change in the mechanical and thermal properties of the end-products produced with such compositions and maintaining the effectiveness of the flame-retardant agent in economically advantageous concentrations.

SUMMARY

The Applicant has found that vinyl polymers containing halohydrin and epoxy groups uniformly distributed in a polymeric composition, confer an excellent stability and effectiveness to this composition in standardized flame-resistance tests, maintaining the mechanical and thermal properties they would have in the absence of flame-retardant agents.

An object of the present invention therefore relates to vinyl polymers containing halohydrin and epoxy groups having a weight average molecular mass (Mw) of at least 40,000 Da, a halogen content ranging from 0.6% to 55% by weight, a content of oxirane groups which is such that the oxirane oxygen ranges from 1% to 3% by weight with respect to the halogen content, and having a weight loss of 5% at a temperature of at least 240° C.

A further object of the present invention relates to a flame-retardant polymeric composition which comprises vinyl polymers and vinyl polymers containing halohydrin and epoxy groups having a weight average molecular mass (Mw) of at least 40,000 Da, a halogen content ranging from 1.8% to 55% by weight, a content of oxirane groups which is such that the oxirane oxygen ranges from 1% to 3% by weight with respect to the halogen content, and having a weight loss of 5% at a temperature of at least 240° C.

The halohydrin and epoxy groups are uniformly distributed in said compositions having flame-retardant properties when they are bound to all the chains forming the polymeric fraction of said composition, or when a fraction of polymeric chains that contains both halohydrin groups and epoxy groups is finely dispersed, or uniformly dispersed, so as to form a uniform mixture even if heterogeneous. A non-uniform distribution of said groups implies the use of a greater quantity of halohydrin and epoxy groups for obtaining the same flame-retardant effect, and is therefore not economically advantageous.

A homogeneous distribution of the halohydrin and epoxy groups in the compositions, object of the present invention, is important as it allows the whole composition to be protected with a minimum quantity of halohydrin and epoxy groups.

DETAILED DESCRIPTION

The present invention is now described in detail.

The present invention relates to vinyl polymers containing halohydrin and epoxy groups having a weight average molecular mass (Mw) of at least 40,000 Da, a halogen content ranging from 0.6% to 55% by weight, a content of oxirane groups which is such that the oxirane oxygen ranges from 1% to 3% by weight with respect to the halogen content, and having a weight loss of 5% at a temperature of at least 240° C.

Said vinyl polymers preferably have a weight average molecular mass (Mw) ranging from 40,000 Da to 300,000 Da.

Said vinyl polymers preferably have a halogen content ranging from 1% to 20% by weight.

Said vinyl polymers preferably have a content of oxirane groups which is such that the oxirane oxygen ranges from 1% to 2% by weight with respect to the halogen content.

The distribution of molecular masses can be determined by means of size exclusion chromatography or gel permeation chromatography (GPC) as described by Sadao Mori, Howard G. Barth "Size Exclusion Chromatography" Springer Verlag Berlin Heidelberg 1999. Said distribution can be described using the average molecular masses of the distribution: number average (Mn), weight average (Mw), centrifugal average (Mz), together with the molecular mass value that has the maximum concentration in the polymeric composition or molecular mass at the maximum peak (Mp) of the chromatogram supplied by GPC. For the purposes of the present invention, the averages and molecular mass distribution of the polymer containing halohydrin and epoxy groups should be considered apparent and measured with respect to the polystyrene taken as GPC calibration reference.

The weight loss of a polymeric material with a variation in the temperature is measured with thermogravimetric analysis (TGA), as described, for example, in "Principles and applications of Thermal Analysis" of Paul Gabbott, Blackwell Publishing Ltd. 2008. For the purposes of the present invention, the temperature is determined, at which a sample of polymer loses 5% by weight in a flow of nitrogen of 60 millilitres per minute and with a heating rate of 10° C. per minute from room temperature to 800° C.

The vinyl polymers containing halohydrin and epoxy groups, object of the present invention, can be produced:
  by polymerization of vinyl monomers containing both halohydrin groups and epoxy groups,
  by hydrohalogenation of vinyl polymers containing epoxy groups, or
  by epoxidation and subsequent hydrohalogenation of vinyl polymers containing ethylene double bonds.

The vinyl monomers containing epoxy groups that can be advantageously used for preparing the vinyl polymers described and claimed in the present text can be selected from styrenes substituted on the benzene ring, epoxidized derivatives of hydroxystyrene and hydroxymethylstyrene, esters derivatives of acrylic and methacrylic acid and epichlorohydrin or oligomers of bisphenol and epichlorohydrin. More preferably, said vinyl monomers containing epoxy groups may be selected from glycidyl methacrylate, glycidyloxystyrene and 2,3-epoxypropylvinylbenzylether and products deriving from the reaction of hydroxystyrene, hydroxymethylstyrene and methacrylic acid with epoxy resins consisting of bisphenols and epichlorohydrin.

Glycidyloxystyrene can be prepared as described in U.S. Pat. No. 7,468,415 and the 2,3-epoxypropylvinylbenzylether can be prepared as described by Tomoi M., Oda H. and Kakiuchi in Makromolekulare Chemie, Rapid Communications, Vol. 7, pages 143-148 (1986). The most widely-used vinyl monomer containing epoxy groups and available on a commercial scale is glycidyl methacrylate.

Halohydrins of vinyl monomers containing epoxy groups that can be advantageously used for preparing the polymers described and claimed in the present text are preferably bromohydrins of vinyl monomers containing epoxy groups previously described.

Said halohydrins can be obtained in various ways known in the state of the art, such as, for example, by reaction with HBr, LiBr and acetic acid, as described by C. Bonini and G. Righi in Synthesis (1994) Issue 3, pages 225-238 and in U.S. Pat. No. 8,242,183, and by reaction with elemental Bromine in the presence of polyether-diamines as described by Hashem Sharghi et al., in Bull. Korean Chem. Soc., Vol. 23, No. 11, pages 1611-1615 (2002).

The polymers containing halohydrin and epoxy groups described in the present text can be obtained by the radical copolymerization of vinyl monomers containing halohydrin and epoxy groups previously described with vinyl monomers containing neither halohydrin nor epoxy groups, according to methods known in the state of the art, such as for example in Copolymerization pages 192-232, Encyclopedia of Polymer Science and Engineering Second Edition, vol. 4 Wiley-Interscience Publication (1986). In this way, copolymers are obtained with a random distribution of the comonomers in the chain so that all the polymeric chains contain halohydrin and epoxy groups, guaranteeing a uniform flame-retardant and stabilization effect for the whole polymer.

Vinyl polymers containing halohydrin and epoxy groups have flame-retardant properties and can therefore be advantageously used as flame retardants in polymeric compositions containing vinyl polymers, and preferably containing vinyl aromatic polymers and copolymers.

A further object of the present invention, in fact, relates to a flame-retardant polymeric composition which comprises vinyl polymers, preferably vinyl aromatic polymers and copolymers, and vinyl polymers containing halohydrin and epoxy groups having a weight average molecular mass (Mw) of at least 40,000 Da, a halogen content ranging from 1.8% to 55% by weight, a content of oxirane groups which is such that the oxirane oxygen ranges from 1% to 3% by weight with respect to the halogen content, and having a weight loss of 5% at a temperature of at least 240° C.

In said compositions, the vinyl polymers containing halohydrin and epoxy groups preferably have a weight average molecular mass (Mw) ranging from 40,000 Da to 300,000 Da.

In said compositions, the vinyl polymers containing halohydrin and epoxy groups preferably have a halogen content ranging from 3% to 55% by weight.

In said compositions, the vinyl polymers containing halohydrin and epoxy groups preferably have a content of oxirane groups which is such that the oxirane oxygen ranges from 1% to 2% by weight with respect to the halogen content.

Said compositions can be used as flame retardants.

Said flame-retardant compositions preferably comprise block polymers in which at least one block is the vinyl polymer containing halohydrin and epoxy groups according to what is described and claimed in the present text, and at least one block is a vinyl polymer, preferably a vinyl aromatic polymer or copolymer, having the same chemical formulation as the vinyl polymer containing halohydrin and epoxy groups present in the composition.

Said compositions can be advantageously transformed into granules for subsequent applications.

Vinyl comonomers not containing halohydrin and epoxy groups according to the present invention can be vinyl aromatic monomers, nitriles and $C_1$-$C_{18}$ alkyl esters derivatives of acrylic and methacrylic acid, vinyl acetate, ethylene and mixtures thereof. Preferred vinyl comonomers are styrene, α-methylstyrene, acrylonitrile, methylmethacrylate, methylacrylate, ethylacrylate, n-butylacrylate, 2-ethylhexylacrylate. Styrene is more preferably the most preferred vinyl comonomer.

Said block copolymers can be obtained by controlled chain radical copolymerization such as Nitroxy Mediated Polymerization (NMP), Atom Transfer Radical Polymerization (ATRP), Reversible Addition Fragmentation Transfer (RAFT) as described in Controlled and Living Polymerization Method and Materials edited by Axel H. E. Müller and Krzysztof Matyjaszewski and published by Wiley-VCH Verlag GmbH & Co. Weinheim in 2009. In particular, block copolymers of vinyl aromatic monomers such as styrene can be conveniently synthesized via NMP as described in EP 0960909 and in U.S. Pat. No. 7,388,052.

The block copolymers of the present invention can also be obtained by the grafting of copolymers containing halohydrin and epoxy groups on vinyl copolymers obtained by radical copolymerization with monomers such as acrylic acid, methacrylic acid and maleic anhydride as described by Xanthos M. and Dagli S. S. in Polymer Engineering and Science 31(13) pages 929-935 (1991).

The block copolymers of the present invention can also be obtained by the epoxidation and subsequent formation of halohydrins of block copolymers containing unsaturations such as, for example, styrene-butadiene, styrene-butadiene-styrene block copolymers that can be epoxidized as described in U.S. Pat. Nos. 4,051,199, 4,131,725, 6,576,692, 6,903,164 and in 8,569,424. The halohydrins of the block polymers thus epoxidized can be obtained with methods analogous to those indicated for vinyl monomers containing epoxy groups.

Some examples are provided hereunder for a better understanding of the invention and application scope, even if they in no way represent a limitation of the scope of the present invention.

Example 1

Hydrobromination of Glycidyl methacrylate (GMA)

A 1 litre glass reactor is prepared, equipped with a magnetic stirrer, a reflux cooler connected to a vessel containing a solution of NaOH for neutralizing non-reacted HBr, a temperature probe immersed in the reaction mixture, a glass dip tube for the introduction of gaseous HBr, and a thermostat-regulating jacket with water circulation with an external thermostatic bath.

500 g of GMA (Sigma-Aldrich, Milan—Italy) are charged into said reactor in a nitrogen environment, and 310 g HBr gas (Sigma-Aldrich, Milan—Italy) are then bubbled into the reactor over a period of an hour at 30° C. GMAHBr is obtained with 34.7%, by weight of bromine (determined by argentometric titration after mineralization of the sample in a calorimetric bomb) and 0.37 by weight of oxirane oxygen determined by means of ASTM D1652-04. From the titration of the solution of NaOH which has neutralized the unreacted HBr, it is found that, of the 310 g fed, 267 g have reacted with GMA and 43 g have been neutralized by the solution of NaOH.

Example 2

Copolymerization of styrene and glycidyl methacrylate hydrogen bromide (GMAHBr), Preparation of a Random Styrene-GMAHBr Copolymer with 1.4% of Br.

A 2.4 litre glass reactor is prepared, equipped with an anchor stirrer, a temperature probe immersed in the reaction mixture, a thermostat-regulating jacket with the circulation of silicon oil, thermostat-regulated with an external thermostatic bath. 1,440 g of styrene (Versalis S.p.A., San Donato Milanese—Italy), 60 g of GMAHBr obtained as described in Example 1, 96 g of ethylbenzene (Versalis S.p.A., San Donato Milanese—Italy) and 1.1 g of chain-transfer agent tert-dodecylmercaptane (Sigma-Aldrich, Milan—Italy) are charged into said reactor, at 20° C., in a nitrogen environment. Upon heating the thermostat-regulating oil circulating in the jacket of the reactor, the temperature of the reaction mixture increased up to 125° C. in 2 hours and the reaction temperature was then kept constant at 125° C. for 5 hours. At the end of the 5-hour period at 125° C., the reaction mixture containing about 50% of polymer, was charged into steel cylinders in fractions of 120 g per cylinder. The cylinders were placed in an oven with electric heating and were heated to 150° C. for 3 hours. At the end of the thermostat-regulation period at 150° C., a vacuum was applied to the oven containing the cylinders up to a residual pressure of 20 mbar, the temperature of the oven was then brought to 220° C. in about an hour and was kept constant at this temperature for 30 minutes. After cooling the oven, the polymer contained in the cylinders was extracted and ground in a mill. The polymer granule obtained (about 1,050 g) was analyzed and the following values were determined: Mw 220 kDa, Mw/Mn 2.2, a content of 1.4% by weight of bromine, a weight loss of 5% at a temperature of 315° C., in a nitrogen flow with a flow-rate of 60 ml/min, with a temperature increase of 10° C./min.

Example 3

PS-b-SGMAHBr Block Polymer (via NMP), Synthesis of a Styrene-b-(Styrene-Glycidyl Methacrylate Hydrogen Bromide) Block Copolymer Via Controlled Chain Polymerization.

813 g of styrene, 1.32 g of EPO (Luperox A75, ARKEMA), 0.92 g of 4OH-TEMPO (Sigma-Aldrich) were charged into the reactor of Example 2, at 20° C. Upon heating the thermostat-regulating oil circulating in the jacket of the reactor, the temperature of the reaction mixture increased up to 130° C. in 2 hours and the reaction temperature was then kept constant for 5 hours. 853 g of GMAHBr at 96.8% obtained as described in Example 1 were then charged into the reactor and the reaction was continued for 4 hours and 30'. The reaction mixture containing about 60% of polymer was subsequently discharged into steel cylinders in fractions of 120 g per cylinder. The cylinders were placed in an oven and a vacuum was applied up to a residual pressure of 20 mbar, the temperature of the oven was then brought to 220° C. in about an hour and was kept constant at this temperature for 20 minutes. After cooling the oven, the polymer contained in the cylinders was extracted and ground in a mill. The polymer granule obtained (about 1,000 g) was analyzed and the following values were determined: Mw 115 kDa, Mw/Mn 1.6, a content of 16.5% w/w of bromine, a weight loss of 5% at a temperature of 284° C., in a nitrogen flow with a flow-rate of 60 ml/min, with a temperature increase of 10° C./min.

Example 4

Flame-Resistance Tests of the Polymers Prepared in Examples 2 and 3.

The polymer granules obtained as described in Example 2, were fed to a single-screw extruder which feeds, with a residence time of 7 minutes, at 260 bar and about 190° C., a static mixer at whose inlet 5 parts of a mixture of n-pentane (75%) and iso-pentane (25%) are added. The mixture thus obtained is distributed over holes having a diameter of 0.5 mm, immediately cooled with a jet of water and cut with a series of rotating knives as described in U.S. Pat. No. 7,320,585. The pressure in the granulation chamber is 5 bar and the shear stress is determined so as to obtain granules having an average diameter of 1.2 mm. Water is sprayed as cooling liquid and nitrogen is used as carrier gas of the granules which are then dried with a centrifugal drier; 3 parts of glycerine monostearate, one part of zinc stearate and 0.2 parts of glycerine per 1,000 parts of granules, are then added in a continuous screw mixer. The granules thus obtained were pre-expanded with vapour at 100° C., left to rest for a day and used for the formation of cylinders having a diameter of 260 mm and a height of 40 mm with a density of about 20 g/dm$^3$. The cylinders were placed in a thermostat-regulated chamber at 70° C. for two days. Test samples of 90×190×20 mm were then obtained from the thermostat-regulated cylinders for the flame-resistance test according to the standard DIN 4102, which was passed. A mixture was dry-prepared in a rotating cylinder, consisting of 19 parts of the polymer of Example 3 and 81 parts of polystyrene homopolymer for general uses (GPPS), EDISTIR N2560 (Versalis SpA, San Donato Milanese—Italy), lubricated with paraffin oil and with a MFR (200° C./5 kg) of 3.8 g/10 min (method ISO 1133). The mixture with the polymer of Example 3 thus prepared was extruded in an AMUT single-screw extruder at 190° C., with a residence time of 1-2 minutes, and granulated. The granules were moulded in a Battenfeld 350 press at 190° C. to obtain test samples of 127×12.7×1.59 mm for the flame-resistance tests according to the method UL-94 V as described in "Standard For Tests for Flammability of Plastic Materials For Parts in Devices and Appliances" 3 Edition, Jan. 28, 1980. The test samples passed the flame-resistance tests and proved to be class V2.

The invention claimed is:

1. A vinyl polymer containing halohydrin and epoxy groups having a weight average molecular mass (Mw) of at least 40,000 Da, a halogen content ranging from 0.6% to 55% by weight, a content of epoxy groups which is such that the epoxy oxygen ranges from 1% to 2% by weight with respect to the halogen content, and having a weight loss of 5% at a temperature of at least 240° C.

2. The vinyl polymer according to claim 1, wherein the average molecular mass ranges from 40,000 Da to 300,000 Da.

3. The vinyl polymer according to claim 1, wherein the halogen content ranges from 1% to 20% by weight.

4. The vinyl polymer according to claim 1, wherein the halohydrin groups are bromohydrin groups.

5. A flame-retardant polymeric composition which comprises at least one vinyl polymer and at least one vinyl polymer containing halohydrin and epoxy groups according to claim 1.

6. The composition according to claim 4, wherein the vinyl polymer is at least one vinyl aromatic polymer or copolymer.

7. The composition according to claim 5, wherein the vinyl polymer is at least one block polymer wherein at least one block is a vinyl polymer containing halohydrin and epoxy groups, and at least one block is a vinyl polymer having the same chemical formulation as the vinyl polymer containing halohydrin and epoxy groups.

8. The composition according to claim 5, wherein the at least one vinyl polymer has an average molecular mass ranging from 40,000 Da to 300,000 Da.

9. The composition according to claim 5, wherein the vinyl polymer has a halogen content ranging from 3% to 55% by weight.

10. The composition according to claim 5, wherein the vinyl polymers have a content of epoxy oxygen ranging from 1% to 2% by weight with respect to the halogen content.

11. A method for making a flame retardant comprising incorporating at least one vinyl polymer according to claim 1 in a polymeric composition containing a vinyl polymer.

* * * * *